(12) United States Patent
Dwyer et al.

(10) Patent No.: US 6,874,057 B2
(45) Date of Patent: Mar. 29, 2005

(54) METHOD AND APPARATUS FOR CACHE SPACE ALLOCATION

(75) Inventors: Harry Dwyer, Annandale, NJ (US); John Susantha Fernando, Coopersburg, PA (US)

(73) Assignee: Agere Systems Inc., Allentown, PA (US)

( * ) Notice: Subject to any disclaimer, the term of this patent is extended or adjusted under 35 U.S.C. 154(b) by 363 days.

(21) Appl. No.: 09/975,763

(22) Filed: Oct. 9, 2001

(65) Prior Publication Data

US 2003/0070046 A1 Apr. 10, 2003

(51) Int. Cl.[7] ............................................. G06F 12/00
(52) U.S. Cl. ........................... 711/3; 711/128; 711/145; 711/163; 711/209
(58) Field of Search ............................. 711/3, 128, 145, 711/163, 209

(56) References Cited

PUBLICATIONS

Kaxiras et al, "Cache Decay: Exploiting Generational Behavior to Reduce Cache Leakage Power," IEEE, (2001).
Lai et al., "Dead–Block Prediction & Dead–Block Correlating Prefetchers," IEEE, (2001).
Mendelson et al, "Modeling Live and Dead Lines in Cache Memory System," IEEE, Trans. on Computers, v. 42, No. 1, (Jan. 1993).

*Primary Examiner*—Jack A. Lane

(57) ABSTRACT

A method and apparatus are disclosed for allocating a section of a cache memory to one or more tasks. A set index value that identifies a corresponding set in the cache memory is transformed to a mapped set index value that constrains a given task to the corresponding allocated section of the cache. The allocated cache section of the cache can be varied by selecting an appropriate map function. When the map function is embodied as a logical and function, for example, individual sets can be included in an allocated section, for example, by setting a corresponding bit value to binary value of one. A cache addressing scheme is also disclosed that permits a desired portion of a cache to be selectively allocated to one or more tasks. A desired location and size of the allocated section of sets of the cache memory may be specified.

30 Claims, 3 Drawing Sheets

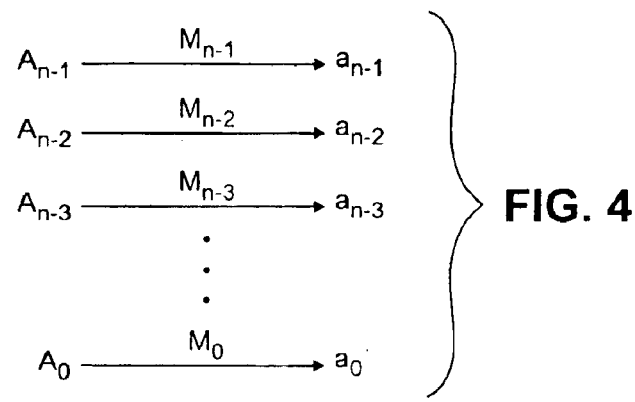
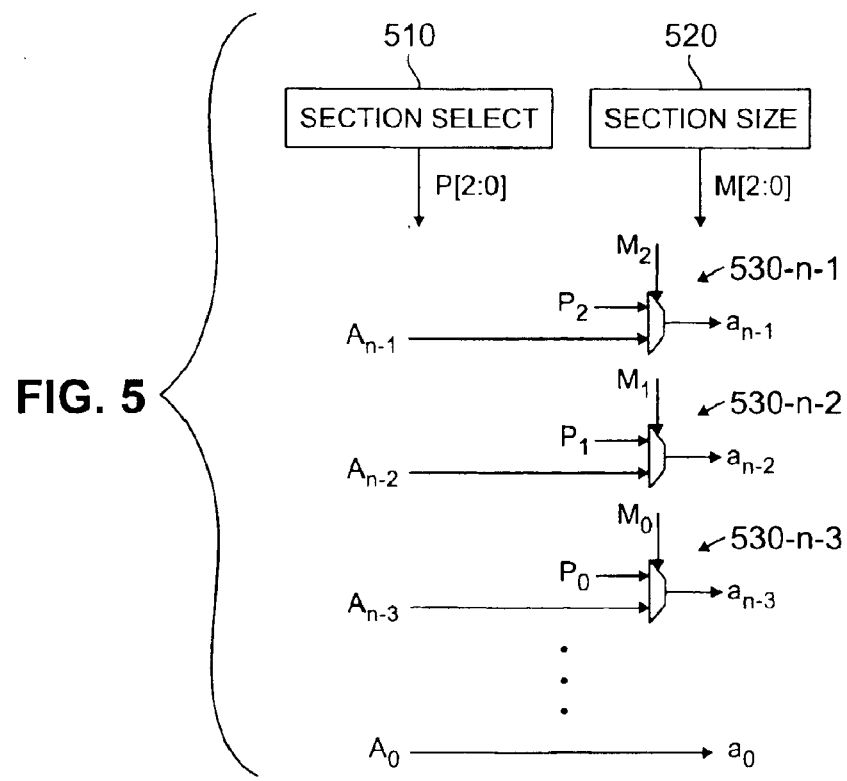

US 6,874,057 B2

METHOD AND APPARATUS FOR CACHE SPACE ALLOCATION

FIELD OF THE INVENTION

The present invention relates generally to cache memory devices, and more particularly, to methods and apparatus for allocating a portion of a cache to a given task.

BACKGROUND OF THE INVENTION

Processors often use a cache to improve performance and decrease system costs. Caches temporarily store recently accessed information (blocks of instructions or data) in a small memory that is faster to access than a larger main memory. Caches are effective because a block that has been accessed once is likely to be accessed soon again or is often near a recently accessed block. Thus, as a task executes, the working set of a task (the instructions and data currently required for the task) is stored in the cache in the event that the information may be accessed again. A cache typically maps multiple blocks of information from the main memory into one place in a cache, typically referred to as a "set". A "block" refers to the minimum unit of information that can be present in a cache and a "frame" is the place in a cache where a single block may be stored. In a set associative cache, multiple frames are grouped into sets. For example, a two-way set associative cache has two frames in each set.

In many embedded applications, a primary task may be interrupted by one or more secondary tasks. Thus, following an interruption, as a secondary, interrupting task executes, the working set of the interrupting task is stored in the cache, potentially evicting the working set of the primary, interrupted task and thereby decreasing the performance of the primary, interrupted task when it resumes execution. When the primary, interrupted task resumes execution, portions of the working set that have been evicted from the cache must be obtained from main memory, causing a "cache miss". Thus, the execution time of the primary, interrupted task is extended by the time taken to run the secondary task plus the miss penalty due to obtaining evicted portions of the cached information from the main memory.

A need therefore exists for a cache management technique that constrains one or more identified tasks to certain portions of a cache. In this manner, one or more secondary tasks may be allocated a certain section of the cache, preserving the unallocated section of the cache for a primary task. In addition, a need exists for a cache management technique that allows a section of the cache to be allocated to one or more identified tasks.

SUMMARY OF THE INVENTION

Generally, a method and apparatus are disclosed for allocating a section of a cache memory to one or more tasks. For example, one or more secondary tasks may be allocated a certain section of the cache, preserving the unallocated section of the cache for a primary task. The present invention transforms a set index value that identifies a corresponding set in the cache memory to a mapped set index value that constrains a given task to the corresponding allocated section of the cache. The allocated cache section of the cache can be varied by selecting an appropriate map function. When the map function is embodied as a logical and function, for example, individual sets can be included in an allocated section, for example, by setting a corresponding bit value to g binary value of one.

A cache addressing scheme is disclosed that permits a desired portion of a cache to be selectively allocated to one or more tasks. In one implementation, a two-to-one multiplexer is employed for each set in the cache. A first register stores the desired size of a section and a second register stores a section selection. A size select value determines the size of an allocated segment and a section selection value determines the particular allocated segment that is selected. In this manner, a desired location and size of an allocated section of sets of the cache memory may be specified.

A more complete understanding of the present invention, as well as further features and advantages of the present invention, will be obtained by reference to the following detailed description and drawings.

BRIEF DESCRIPTION OF THE DRAWINGS

FIG. 4 illustrates a map function, M, that maps a set index, A, to a mapped set index, a, in accordance with the present invention; and FIG. 5 illustrates a cache addressing scheme that permits a portion of the cache to be selectively allocated to one or more tasks in accordance with another embodiment of the present invention.

DETAILED DESCRIPTION

Figure 1:
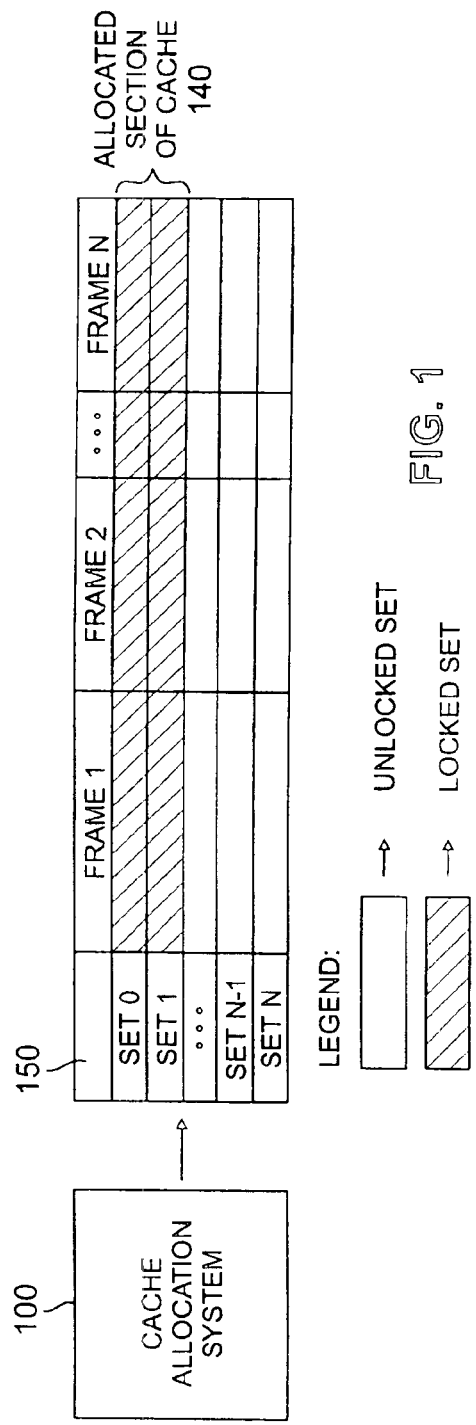
FIG. 1 illustrates a cache allocation system in accordance with the present invention.

FIG. 1 illustrates a cache allocation system 100 in accordance with the present invention. As shown in FIG. 1, the cache allocation system 100 allocates a section 140 of the cache 150 to one or more tasks. For example, one or more secondary tasks may be allocated a certain section of the cache. Thus, the secondary tasks may use only the allocated section of the cache, preserving the unallocated section for the primary task and consequently reducing the eviction of live lines of the primary task. In this manner, the number of misses suffered on resumption of the primary task is reduced. It is recognized that limiting the cache space used by the secondary task may increase the misses for the secondary task. Thus, the benefits of the present invention are fully realized only in cases where the penalty on the secondary task is less than that experienced by the primary task due to eviction of lines accessed later. The benefit is most evident in the case where the secondary task is sequential and large relative to the cache. The cache allocation system 100 and cache 150 can be part of a digital signal processor (DSP), microcontroller, microprocessor, application specific integrated circuit (ASIC) or another integrated circuit.

Figure 2:
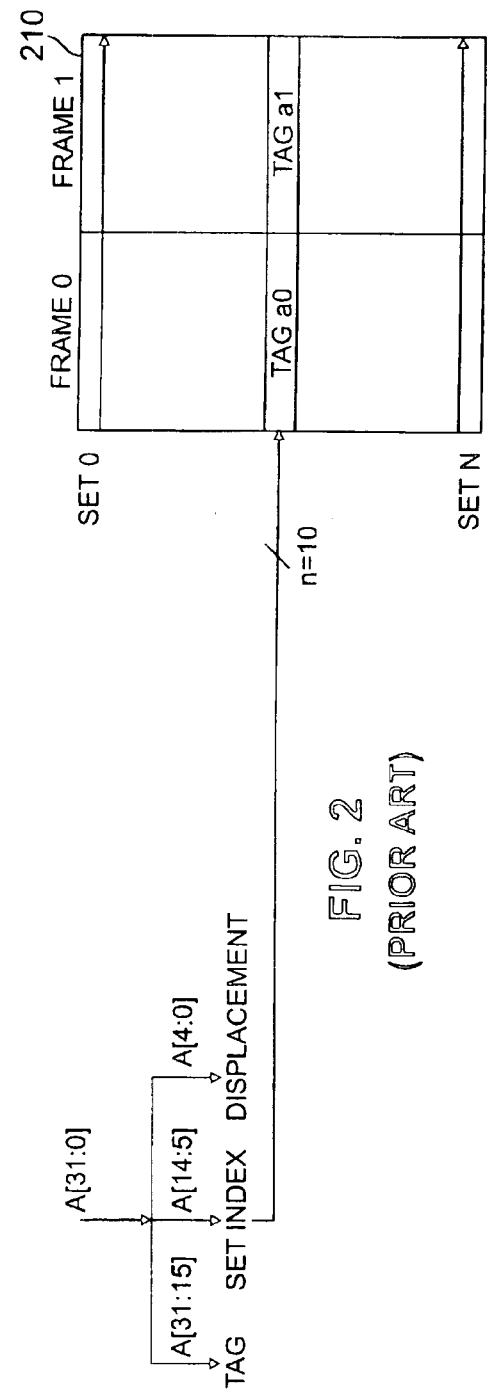
FIG. 2 illustrates a conventional scheme for addressing a cache, such as the cache of FIG. 1.

FIG. 2 illustrates a conventional scheme for addressing a cache, such as the cache 150 of FIG. 1. As shown in FIG. 2, the exemplary cache 210 is a two-way set associative (two frames per set) 64 Kilobyte cache having 32-byte blocks. A portion of the 32 bit address of a block of main memory is a ten (10) bit set index value identifying the corresponding set in the cache 210. While the present invention may be incorporated into all cache organizations (data or instruction), the present invention is illustrated with a two-way set associative instruction cache that has two frames at each set address.

Figure 3:
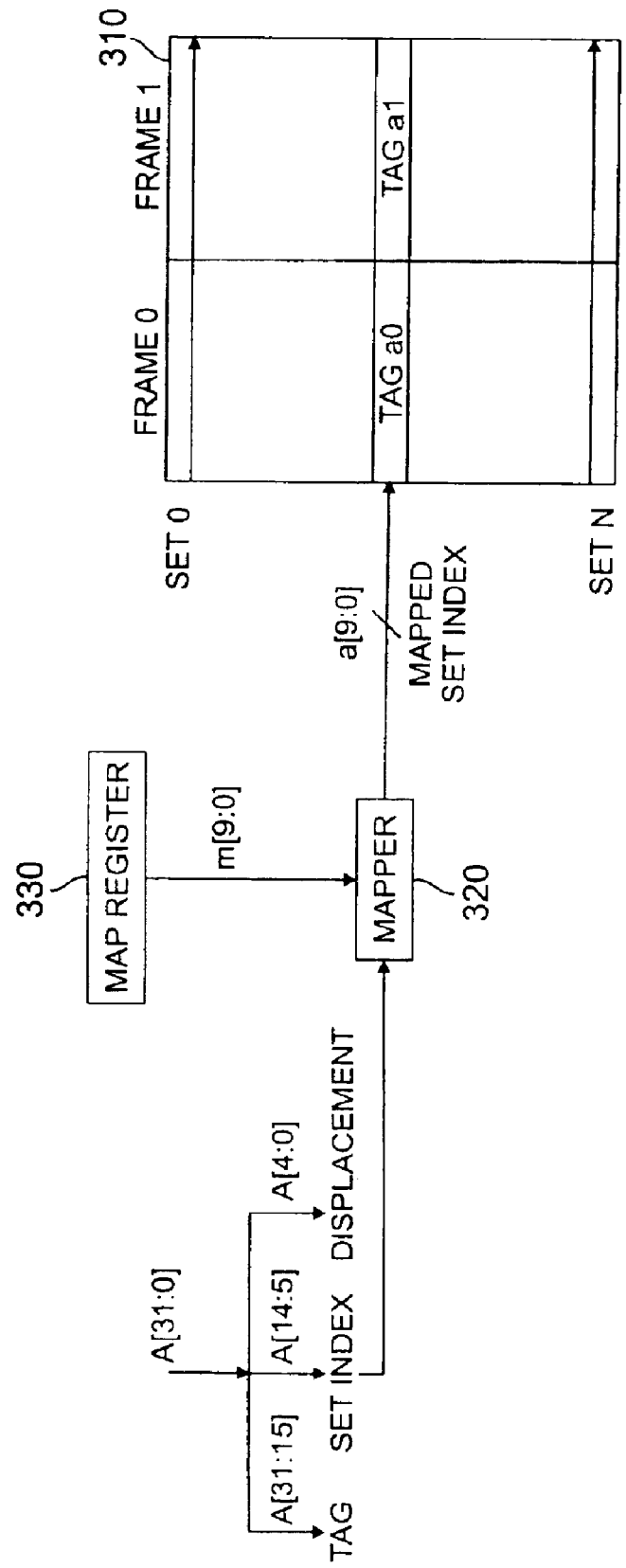
FIG. 3 illustrates a cache addressing scheme that permits portion of the cache to be allocated to one or more tasks in accordance with the present invention.

FIG. 3 illustrates a cache addressing scheme that permits a portion of the cache 310 to be allocated to one or more tasks in accordance with the present invention. The exemplary cache structure and main memory addressing of FIG. 3 performs in a similar manner to the corresponding conventional functions shown in FIG. 1. The allocation scheme of the present invention introduces a mapper 320 and a map register 330 to the conventional cache addressing scheme of FIG. 1.

As discussed further below, the mapper 320 transforms the set index, A, portion of the memory address to a mapped set index, a, using a set of map bits, M, in accordance with a mapping function. The mapped set index, a, constrains a given task to the corresponding allocated section 140 of the cache. Thus, if the set index, A, identifies a given set 0 to N, the mapped set index, a, identifies a given set in the constrained allocated cache section 140. The allocated cache section 140 of the cache 310 can be varied by selecting an appropriate map function to be implemented by the mapper 320. The map register 330 identifies the allocated section 140 for each task.

In one exemplary embodiment, the mapper 320 may be implemented as a logical bit-wise AND function, allowing the following useful maps:

$M_i$=1, for all i: entire cache is allocated;
$M_i$=0, for all i: only set 0 is allocated;
$M_i$=1, for all i except i=n−1, (n is width of set index): lower half of cache is allocated; and
$M_i$=1, for i <n−3: lower eighth of cache is allocated.

In a further variation discussed below in conjunction with FIG. 5, the mapper 320 may be implemented as a multiplexer allowing additional flexibility to isolate allocated sections 140 of the cache. FIG. 4 illustrates the map function, M, between the set index, A, and the mapped set index, a, for the exemplary logical bit-wise AND function.

The tag bits (bits 15 through 31 in the exemplary conventional cache addressing scheme of FIG. 1) must be increased to correspond to the smallest cache section (i.e., by the number of bits set to zero in M). Consequently, as the allocated section gets smaller, the tags become larger. A reasonable compromise may be achieved by limiting the smallest allocated section size to 1/32nd of the cache size. This corresponds to five (5) extra bits for the tag. Furthermore, in this embodiment, the bits that are set to zero must be contiguous from $M_{n-1}$. Thus, the cache is allocated from set 0 and up. With limited size of the smallest section, the map register 330 requires only the bits corresponding to the fraction of the cache that the smallest section comprises. For example, for allocating a cache into eight portions, only three bits are required for the map register 330.

Selectable Allocated Cache Section

As previously indicated, the exemplary embodiment discussed above in conjunction with FIGS. 1, 3 and 4 must allocate the cache consecutively beginning with set 0. FIG. 5 illustrates a cache addressing scheme that permits a portion of the cache 310 to be selectively allocated to one or more tasks in accordance with another embodiment of the present invention. With selective allocation, a cache having a smallest allocable section of s sets can be allocated in sections of size N/s, where s is some fraction of the N sets in the cache. The map function, M, required for selective allocation is shown in FIG. 5. The size allocation and selection logic in the address scheme of FIG. 5 requires a 2-to-1 multiplexer 530-i for each address line, i, affected.

A map register 520 stores the size of a section and a map register 510 stores the section selection. The size select bits, M, from the size map register 520 determine the size of the segment. For example, if the minimum cache section is an eighth of the overall cache size, three (3) bits are required (M[2:0]) to select the size of the section. The selection also requires three (3) bits (P[2:0]) to select the section that is allocated. As shown in FIG. 5, an M bit set to a binary value of one (1) allows the set index to be used directly. If an M bit is set to a binary value of zero (0), then the corresponding P bit is selected by the multiplexer 530. For example, for M having a value of "000" and P having a value of "010," the third eighth of the cache is allocated. Similarly, for M having a value of "001" and P having a value of "01x," the second quarter of the cache is allocated.

The selective allocation scheme shown in FIG. 5 is useful, for example, for allocating sections to nested secondary tasks. In summary, the embodiment of FIG. 5 allows a cache to be allocated in sections, with section size and section location being selected by writing a map register. The logic requires only a 2-to-1 multiplexer 530 in the critical address path, and a small number of bits for each tag.

It is to be understood that the embodiments and variations shown and described herein are merely illustrative of the principles of this invention and that various modifications may be implemented by those skilled in the art without departing from the scope and spirit of the invention.

We claim:

1. A cache memory, comprising:
   a plurality of sets of cache frames for storing information from main memory; and
   a cache allocation system for allocating one or more sets of said cache memory to one or more tasks, wherein one or more secondary tasks may use only said allocated sets of said cache memory.

2. The cache memory of claim 1, wherein one or more primary tasks may use unallocated sets of said cache memory.

3. The cache memory of claim 1, further comprising a mapper that transforms a set index, A, identifying a set in said cache memory to a mapped set index, a, identifying a set with said allocated portion of said cache memory.

4. The cache memory of claim 1, wherein said allocated sets of said cache memory can be varied by selecting an appropriate map function.

5. The cache memory of claim 4, wherein said map function is a logical and function and wherein a given set of said cache memory is allocated to a given task by assigning said set a predefined binary value.

6. The cache memory of claim 1, further comprising a map register for identifying said one or more sets of said cache memory allocated to each task.

7. The cache memory of claim 1, wherein a size of said allocated one or more sets of said cache memory may be specified using a size select value.

8. The cache memory of claim 1, wherein one of said allocated sections of sets of said cache memory may be specified using a section select value.

9. The cache memory of claim 1, wherein a desired location and size of said allocated sections of sets of said cache memory may be specified.

10. A method for allocating space in a cache memory, said method comprising the steps of:
    storing information from main memory in a plurality of sets of said cache memory; and
    allocating one or more of said sets of said cache memory to one or more tasks, wherein one or more secondary tasks may use only said allocated sets of said cache memory.

11. The method of claim 10, wherein one or more primary tasks may use unallocated sets of said cache memory.

12. The method of claim 10, further comprising the step of transforming a set index, A, identifying a set in said cache memory to a mapped set index, a, identifying a set with said allocated portion of said cache memory.

13. The method of claim 10, further comprising the step of selecting an appropriate map function to vary said allocated sets of said cache memory.

14. The method of claim 13, wherein said map function is a logical and function and further comprising the step of allocating a given set of said cache memory to a given task by assigning said set a predefined binary value.

15. The method of claim 10, further comprising the step of identifying said one or more sets of said cache memory allocated to each task.

16. The method of claim 10, further comprising the step of specifying a size of said allocated one or more sets of said cache memory.

17. The method of claim 10, further comprising the step of specifying one of said allocated sections of sets of said cache memory.

18. The method of claim 10, further comprising the step of specifying a desired location and size of said allocated section of sets of said cache memory.

19. A cache memory, comprising:

means for storing information from main memory in a plurality of sets of said cache memory; and means for allocating one or more of said sets of said cache memory to one or more tasks, wherein one or more secondary tasks may use only said allocated sets of said cache memory.

20. The cache memory of claim 19, further comprising means for transforming a set index, A, identifying a set in said cache memory to a mapped set index, a, identifying a set with said allocated portion of said cache memory.

21. The cache memory of claim 19, wherein said allocated sets of said cache memory can be varied by selecting an appropriate map function.

22. The cache memory of claim 21, wherein said map function is a logical and function and wherein a given set of said cache memory is allocated to a given task by assigning said set a predefined binary value.

23. The cache memory of claim 19, further comprising means for identifying said one or more sets of said cache memory allocated to each task.

24. The cache memory of claim 19, wherein a desired location and size of said allocated sections of sets of said cache memory may be specified.

25. An integrated circuit, comprising:

a cache memory having a plurality of sets of cache frames for storing information from main memory; and a cache allocation system for allocating one or more sets of said cache memory to one or more tasks, wherein one or more secondary tasks may use only said allocated sets of said cache memory.

26. The integrated circuit of claim 25, wherein one or more primary tasks may use unallocated sets of said cache memory.

27. The integrated circuit of claim 25, further comprising a mapper that transforms a set index, A, identifying a set in said cache memory to a mapped set index, a, identifying a set with said allocated portion of said cache memory.

28. The integrated circuit of claim 25, wherein said allocated sets of said cache memory can be varied by selecting an appropriate map function.

29. The integrated circuit of claim 25, further comprising a map register for identifying said one or more sets of said cache memory allocated to each task.

30. The integrated circuit of claim 25, wherein a desired location and size of said allocated sections of sets of said cache memory may be specified.

* * * * *